US008255069B2

(12) United States Patent
Evans et al.

(10) Patent No.: US 8,255,069 B2
(45) Date of Patent: Aug. 28, 2012

(54) DIGITAL AUDIO PROCESSOR

(75) Inventors: Matt Evans, San Francisco, CA (US); Ole Lagemann, Hamburg (DE); John Danty, SW Calgary (CA); Jan-Hinnerk Helms, Hamburg (DE); Gerhard Lengeling, Los Altos, CA (US); Alexander Soren, San Francisco, CA (US); Timothy Benjamin Martin, Sunnyvale, CA (US); Stefan Pillhofer, Hamburg (DE)

(73) Assignee: Apple Inc., Cupertino, CA (US)

( * ) Notice: Subject to any disclaimer, the term of this patent is extended or adjusted under 35 U.S.C. 154(b) by 1158 days.

(21) Appl. No.: 11/834,673

(22) Filed: Aug. 6, 2007

(65) Prior Publication Data

US 2009/0043410 A1 Feb. 12, 2009

(51) Int. Cl.
*G06F 17/00* (2006.01)

(52) U.S. Cl. ........................................................ 700/94

(58) Field of Classification Search .................. 381/119, 381/61; 700/94; 369/4
See application file for complete search history.

(56) References Cited

U.S. PATENT DOCUMENTS 5,153,829 A * 10/1992 Furuya et al. .................... 84/622
5,212,733 A * 5/1993 DeVitt et al. .................. 381/119
5,781,188 A * 7/1998 Amiot et al. .................. 715/723
6,222,549 B1 4/2001 Hoddie
6,490,359 B1 * 12/2002 Gibson .......................... 381/119
6,704,012 B1 3/2004 Lefave
6,898,291 B2 * 5/2005 Gibson .......................... 381/119
6,959,220 B1 10/2005 Wiser et al.
7,328,412 B1 2/2008 Cannistraro et al.
7,343,210 B2 * 3/2008 DeVito et al. ................... 700/94
7,742,609 B2 * 6/2010 Yeakel et al. ................. 381/119
7,774,707 B2 * 8/2010 Sim et al. ....................... 715/727
2002/0178006 A1 11/2002 Suzuki et al.
2007/0175317 A1 * 8/2007 Salter .............................. 84/609
2008/0215599 A1 * 9/2008 Yun ............................... 707/100

OTHER PUBLICATIONS

David Pogue, *GarageBand 2 The Missing Manual*, Aug. 2005, O'Reilly Media, Sebastopol, California, USA [cover, title page and Table of Contents (6 pages total)].
Mary Plummer, *GarageBand 3 Create and Record Music on a Mac*, 2006, Peachpit Press, Berkeley, California, USA [cover, title page and Table of Contents (6 pages total)].
Gavenda, Victor "GarageBand 2 for Mac OS X: Visual Quickstart Guide," Apr. 15, 2005, 32 pages.

* cited by examiner

*Primary Examiner* — Andrew C Flanders
(74) *Attorney, Agent, or Firm* — Blakely, Sokoloff, Taylor & Zafman LLP

(57) ABSTRACT

A digital audio processor is described, wherein a graphical user interface is presented on the monitor of the processor to display user actionable control elements in a scene of a real world environment for creating and processing music; the graphical user interface is adapted to activate pre-set functions for generating and processing digital audio data in the digital audio processor for each of the user actionable control elements.

23 Claims, 3 Drawing Sheets

DIGITAL AUDIO PROCESSOR

RELATED APPLICATIONS

This application is related to co-pending U.S. application Ser. No. 11/834,668 filed on the same day, which is incorporated herein by reference.

The present invention relates to a method of operating a digital audio processor and a graphical interface for a digital audio processor.

BACKGROUND OF THE DISCLOSURE

Computers and other data processing systems are increasingly used by the general public to compose or modify music in the form of digital audio data. Digital audio processing software is e.g. available from APPLE Inc. under the product names GarageBand (for home use) and Logic Pro (for professional use). Such Digital Audio Workstations (DAW) or data processing systems allow the user to build a piece of music. Some DAWs or processors offer specific functionality to allow the user to build a piece of music without the need for musical knowledge. In such a DAW or processor, all the user has to do is to arrange small music building blocks, each containing a specific musical phrase played by a certain instrument.

However, creating a piece of music from elementary building blocks is cumbersome for inexperienced users and distracts from the artistic endeavour of composing a new piece of music or a song in a desired style with conventional accompaniments.

Pre-recorded accompaniments are made available in known systems in different musical styles or genres, each being possibly recorded with different instruments. The user can select a particular accompaniment and then additionally record his musical performance in vocal or in instrument style. The available choices of musical styles and accompaniments are conventionally displayed in hierarchical selection menus, which may be invoked as a drop-down list, a button matrix, a file browser etc. and where the desired item has to be selected by a series of operations, e.g. clicking a sequence of alphanumerical control buttons. Again the selection of the accompaniments and instruments with such menus is cumbersome and distracting from the creative effort.

In addition, the task of verifying a selected accompaniment (pre-listening) and changing or replacing its musical genre or the instruments used is not provided for in the prior art systems or requires complex handlings.

SUMMARY OF THE DESCRIPTION

The present invention provides an improved method and a system of processing digital audio data or other time based streams of digital data.

An embodiment of the present invention provides a method of operating a digital audio processor, wherein a graphical user interface (GUI) is presented on the display device of the digital audio processor to display user actionable control elements in a scene of a real world environment for creating and processing music; the graphical user interface is adapted to activate pre-set functions for generating and processing digital audio data in the digital audio processor for each of the user actionable control elements.

The real world presentation allows inexperienced users to focus on the creative tasks without being distracted by complex computer operation of conventional systems. At the same time the full range of processing is maintained for the sophisticated user of the digital audio processor.

In an embodiment of the invention, actionable control elements are visual representations of real world musical instruments and the pre-set functions are digital audio data stored in the digital audio processor for selection in accordance with the visual representations. The feature provides an intuitive access to the basic functions of the digital audio processor.

In a further embodiment of the invention, the stored digital audio data is pre-recorded with the musical instrument of the visual representation in a specified musical style. This allows presenting a selection of musical styles and tempi in a defined musical genre.

In a further embodiment of the invention, the digital audio data is stored in a mass storage and retrieved by the digital audio processor after the user having selected a set of visual representations. Thereby, a large set of pre-recorded musical styles can be provided for selection by the user even if the main memory of the processor is limited.

In a further embodiment of the invention, the user-selected digital audio data is displayed as a stack of tracks in a second graphical user interface DAW GUI displayed on the monitor of the digital audio processor for processing the digital audio data. In this second graphical user interface, the full range of operations of the digital audio processor is available.

In a further embodiment of the invention, the stack of tracks comprises a selection of empty tracks for future recordings by the user.

The graphical user interface for a digital audio processor in accordance with the invention comprises a plurality of graphical control elements that represent music-related objects in a real-world environment for creating and processing music as well as operative connections between the graphical control elements and pre-set functions of a digital audio processor adapted to create and modify digital audio data.

In a preferred embodiment, the graphical control elements represent musical instruments and the operative connections invoke digital audio data pre-recorded by the visualized musical instrument in a specific genre and style of music.

In a further preferred embodiment, a first set of visualized musical instruments represents a default selection of instruments for a specified music genre.

In a further preferred embodiment, activation of a visualized musical instrument causes the display of alternate visualized musical instruments linked to the digital audio data for selection by the user.

In a further preferred embodiment, activation of a visualized musical instrument causes the display of a selection menu with entries linked to the digital audio data.

In a further preferred embodiment, a selected graphical control element is highlighted by a spot light in the real world environment.

In a further preferred embodiment the graphical user interface provides a first screen with a selection menu for the genre of music, wherein the first screen is invoked before the second screen for selecting the instruments. The selection items in the first screen are preferably posters with contents that are used in the second screen to display the selection of the genre of music.

The present invention has the advantage of providing a graphical user interface for composing and arranging pieces of music that is particularly adapted to the needs of the inexperienced user and the capabilities of the underlying computer. Usability is increased by presenting intuitively understandable control elements in the form of application-specific graphic symbols in a real world environment characteristic of the application. The real world interface allows invoking a workflow to be executed by the computer upon selection of the symbol by the user.

These embodiments may be implemented using a method, a program, a program product, a user interface, a computer system, a data processing system or a consumer electronic device or any combination of such implementations.

The present invention, its features and advantages will best be understood from the following detailed description of illustrative embodiments when read in conjunction with the accompanying drawings.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
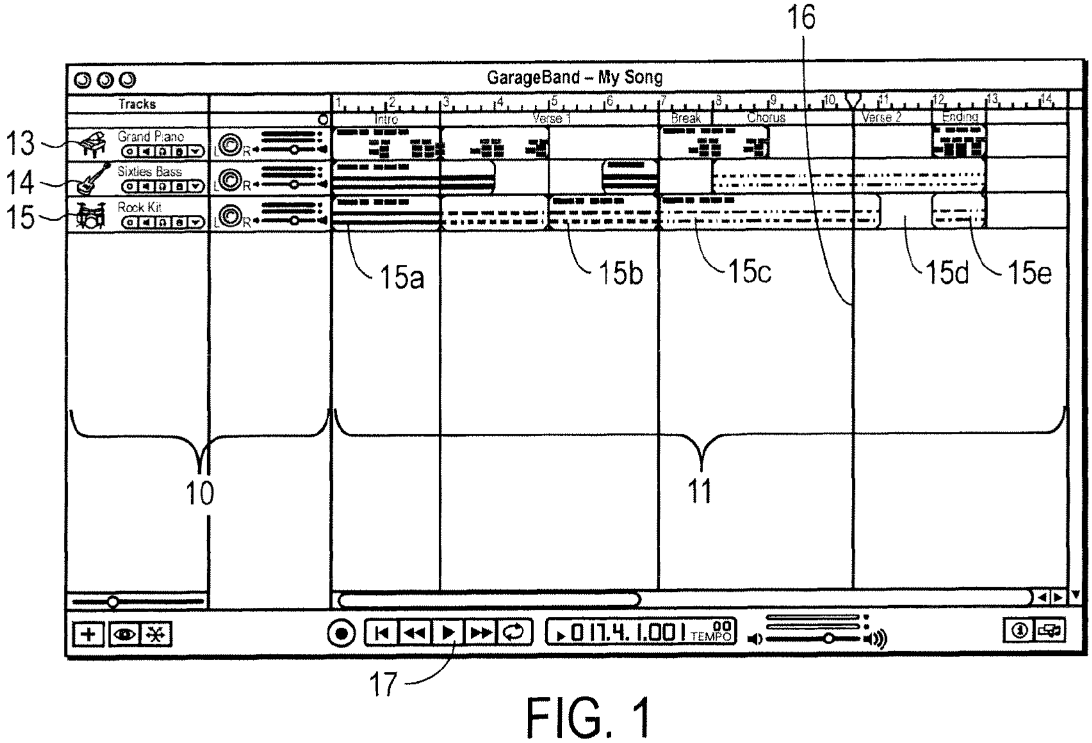
FIG. 1 is a view of a graphical interface DAW GUI known in the prior art of digital audio processors to create and manipulate a piece of music in the form of digital audio data.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2007.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magneticoptical disks, readonly memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

FIG. 2B of U.S. Pat. No. 6,222,549, which is hereby incorporated herein by reference, shows one example of a data processing system, such as a computer system, which may be used with the present invention. Note that while this Figure illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this Figure may, for example, be a Macintosh computer from Apple Inc.

A machine readable medium includes any mechanism for storing or transmitting information in a form readable by a machine (e.g., a computer). For example, a machinereadable medium includes read only memory ("ROM"); random access memory ("RAM"); magnetic disk storage media; optical storage media; flash memory devices; electrical, optical, acoustical or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

In the following detailed description of exemplary embodiments of the invention and in the figures, the same elements and components are designated by the same terms and the same reference numerals.

A preferred embodiment of the invention is based on the software product GarageBand manufactured by Apple Inc. Details of this product are described e.g. by Mary Plummer in "Apple Training Series GarageBand" (Apple Training) ISBN-10: 0321421655 and by David Pogue in "GarageBand 2: The Missing Manual" ISBN-10: 0596100353, which are incorporated herein by reference. It is understood, however, that the invention is not limited to this particular implementation and can be used with minor modifications in any DAW system or other data processing system.

An embodiment of the invention will be first described in its external characteristics as controlled by the user and then in its essential internal structures and operations. Functions and components well known to the expert in the field of digital audio processing are not described in detail for clarity and conciseness.

FIG. 1 shows an example of a prior art graphical user interface DAW GUI for creating and modifying a piece of music with a computer that executes a software product for processing digital audio data (or DAW). The DAW GUI 1 is used to control the operation of the DAW. One instantiation of such a DAW GUI structure is used for one piece of music and can be named (e.g. as My Song in FIG. 1). A processed DAW GUI and its internal data can be saved in permanent storage when the operation of the DAW is terminated, either after completion of the piece of music or at any intermediate point of the creation. The stored data comprises the audio information as well as control information for rendering the audio information (so called automation data) in one or more digital files which may be used to play back the song or other audio data.

In the preferred embodiment, the computer stores the audio part of the created piece of music e.g. in AIFF format (Audio Interchange File Format). Other formats can be used in addition or alternatively, e.g. MP3 or other digital audio formats as well as the MIDI format (Musical Instruments Definition Interface), either directly or after compression. Hereinafter, the term digital audio data includes the MIDI files.

An empty DAW GUI 1 is displayed as a window on a computer screen when a new piece of music is to be created. The DAW GUI comprises two main fields: a header field 10 for receiving information about the instrument selected by the user for this piece of music and an arrange field 11 for receiving audio building blocks selected by the user. The arrange field 11 has at its top a time scale 12 indicating the bars of the piece of music.

The instruments and the pre-built musical building blocks available in the DAW GUI 1 are presented to the user in a selection menu (not shown in FIG. 1) for dragging a selected item into the header field and the portion of the arrange field 11 associated with the track header, respectively. This area following the track header is also called the track space. The user selects the musical building blocks for the track space of a specific header according to the genre of music to be played, the instrument, the mood and possibly other characteristics.

A track header in the header field and its associated track space for the musical building blocks form a horizontal track in DAW GUI 1. A piece of music may comprise a substantial number of such tracks which are shown in DAW GUI 1 as a horizontal stack. New tracks may be added below the last existing track and tracks may be deleted or sorted. Each track header comprises conventional controls for individually setting the audio characteristics of the track (volume, pan, mute, etc). These header controls operate only on the track itself and on the track as a whole.

In addition to the overall audio control, each track may have an associated track with automation data. Such automation data and parameters allow e.g. to vary the volume in the track differently at different positions or similarly for pitch, reverb level, fade etc. The automation data is associated with the track, not with the individual musical building blocks. Automation tracks are not shown in FIG. 1 for simplicity reasons.

Different types of musical building blocks (also called regions) are available for selection: Real Instrument (RI) regions which contain music phrases that were pre-recorded with a real instrument of the type indicated by the header; software instruments (SI) regions with synthetic phrases in MIDI format. RI and SI blocks may not be mixed in a single track. SI and RI regions can also be created by recording audio data or MIDI data. The Apple GarageBand product provides preinstalled building blocks called Apple loops, which are SI or RI regions with certain metadata (e.g. tempo, beat number, time signature, genre of music to be played, the instrument, the mood and possibly other characteristics).

In the example of the DAW GUI 1 in FIG. 1, the user has selected three instruments (Grand Piano, Sixties Bass and Rock Kit) and thus three tracks 13, 14, are shown. For track 13 (the grand piano), the user has selected a building block "Blues Bar 05" which is represented here in piano roll notation. In track 13, the user has chosen to repeat the building block "Blues Bar 05" for the length of four bars followed by a pause before it is again repeated.

For track 14 (the Sixties Bass), the user has selected the building block "Blues Bar Bass 02.1", which is an RI and shown here as a waveform. This building block extends over the first three bars and is followed by a pause before it repeats again with bar 6.

In track 15 (the Rock Kit), the building block 15*a* "Beach Side Drum Set2.0" is a MIDI file in piano roll notation, extends form the beginning to bar 5 and is then extended with building block 15*b* "Beachhead fill" until bar 7. A copy 15*c* of building block 15*a* follows until bar 11 and a building block 15*e* with an intermediate gap 15*d.*

For playing back the piece of music as defined by the selected instruments (headers) and musical building blocks, conventional audio control buttons 17 are provided at the bottom of DAW GUI 1. The state of playback is indicated by a playhead 16, which moves across the arrange field as playing of the piece of music progresses. Any change in the selection of instruments (headers), musical building blocks, their length, repetition rate or the audio characteristics can thus be observed directly in the DAW GUI 1 and checked by immediate playback of a selected track alone or in combination with other tracks.

After a new song has been finished, the user may want to modify the style or the instruments of the accompaniments. A modification of the finished song has to be reflected in each of the tracks (which may be many), so that any such change requires substantial time and effort.

The present invention therefore provides a new functionality to create and modify accompaniments for pieces of music with a DAW in an easy to use way.

The invention teaches a new and effective graphical user interface RW GUI for specified functions of a DAW. In addition, it maintains, at least in certain embodiments, access to the full functionality of the DAW.

The special graphical user interface of the invention presents pre-set choices available under the DAW in an intuitively understandable environment that is adapted to the application for which the underlying system and software are intended.

Figure 2:
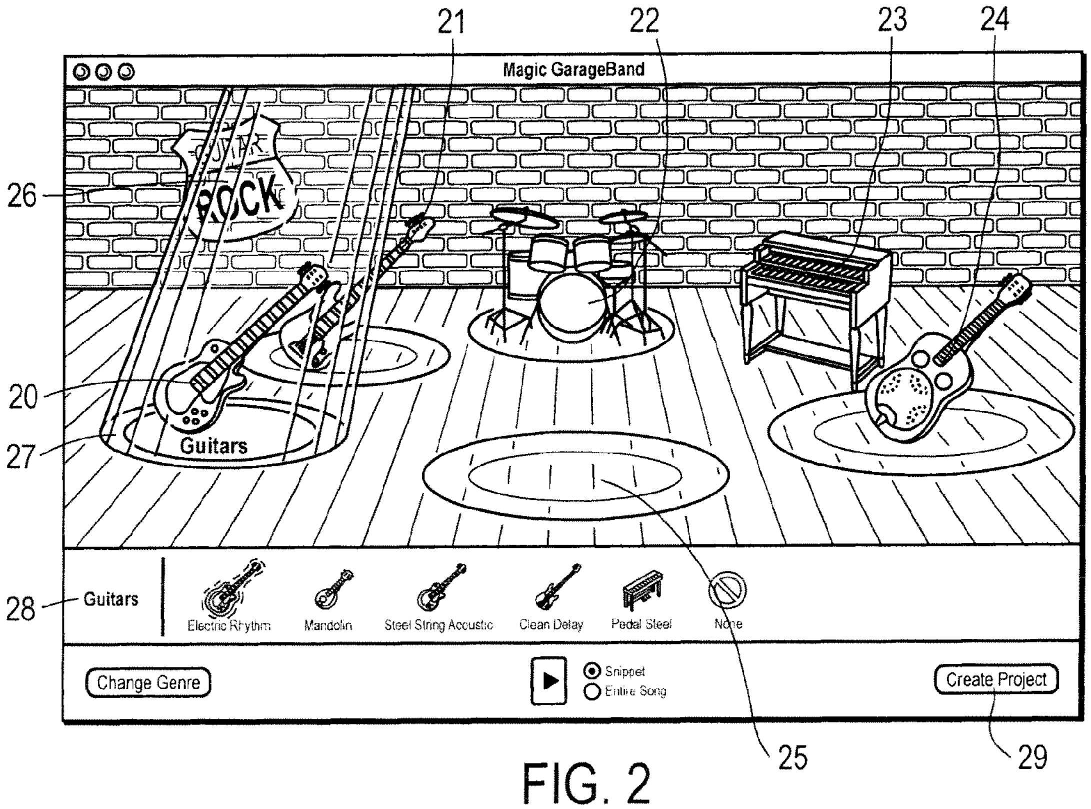
FIG. 2 shows an embodiment of a real world (RW) GUI for a digital audio processor in accordance with an embodiment of the present invention.

In the specific case of a Digital Audio Workstation, a RW GUI is presented to the user in the form of a real world RW image of a stage for performing musicians with representations (e.g. images) of real world musical instruments on the stage. In the following, this real world graphical user interface will be called RW GUI. FIG. 2 shows an example of a RW GUI.

The RW GUI presents one or more interactive screens with pre-selected options for operating the underlying DAW. In the specific example of a preferred embodiment, a first screen of the RW GUI allows the user to select the genre of the music that is offered by the manufacturer of the DAW as pre-set choices. The real world scene of this first RW GUI screen represents the view on a stage for performing musicians with the curtain closed. This first screen presents a selection menu for the available genres of music (e.g. blues, rock, hip-hop, soul, etc). The selection items for the genre of music are preferably arranged under the closed curtain of the real world stage and presented in the form of posters with a content characteristic for the respective genre of music. The same contents can be used in the second screen of the RW GUI to indicate the then selected genre of music, e.g. by projecting the contents on back of the stage with the opened curtain.

This first screen of the RW GUI further offers a preview button for previewing or pre-listening the available genres of music as performed by the default selection of instruments and styles of the DAW. Previewing can be selected either for full length or for a music snippet.

If the user indicates his satisfaction with the selection by activating a control button (e.g. "Audition") on the first screen of the RW GUI, the curtain of the stage opens and presents instruments pre-selected by the manufacturer of the DAW for the selected music genre. This second screen of the RW GUI allows selecting instruments and styles and possibly other characteristics, like tempi for accompaniments for a piece of music to be created in the selected style.

FIG. 2 shows the state of second screen in the RW GUI after the user has selected the music genre "ROOTS ROCK"; the instruments shown on the stage are those pre-selected by the manufacturer of the DAW for this genre of music. In the example of FIG. 2, the instruments are arranged as in a real rock band: from left to right Guitars 20, Bass 21, Drums 22, keyboards 23 and Melody 24. An illuminated spot 25 in the centre of the stage marks the place for the user and is the control element to be clicked for selecting the instrument that the user will play as a member of the band shown on the stage. The selected genre of music is indicated as a projection 26 on the brick wall at the rear of the stage.

If the user selects a specific one of the displayed instruments with a pointing device or other cursor control device, e.g. a mouse, this instrument is illuminated by a spotlight 27 and in front of the stage the alternative instruments are shown in a menu 28 allowing the user to select the instruments that are available to replace the highlighted instrument (the default selection by the manufacturer of the DAW).

FIG. 2 shows the state when the user has selected the guitars 20 and is presented with a list of available guitar types: "Electric Rhythm", "Mandolin", "Steel String Acoustic", "Clean Delay", "Pedal Steel" and "None" in menu 28. The available instrument selections are indicated by small icons in the form of the respective instrument. After an alternate instrument has been selected, the original instrument icon on the stage is replaced by a large icon of the user selected instrument. If the user selects the option "None", the highlighted instrument is deleted and its place on the stage remains empty.

After each instrument selection, the user can activate a preview/pre-listen function in the RW GUI to play the entire song (e.g. by activating a control button "Entire song") or a predefined part of it (e.g. by activating a control button "Snippet"). The selection of "entire song" or "snippet" is maintained even if the selection of an instrument is changed. Return to the opening screen of the RW GUI to change the music genre is also possible by hitting a control button, e.g. "Change genre".

As an alternative, the selection of an alternate instrument can be effected by clicking long on the respective large icon on the stage to open a drop-down list with the alternatives to the selected instrument.

When the user has made his choice for all the instruments on the stage, including the instrument or microphone he will use, the control element 29 "Create Project" can be hit to return to the basic DAW GUI 1 of the DAW shown in FIG. 1.

On the level of the basic DAW GUI 1 the experienced user has access to the full spectrum of manipulations available in the DAW. The inexperienced user will normally refrain from such modifications and just use the recording function of the basic DAW GUI 1 to record his own performance together with the unmodified selected accompaniments.

Alternatively, the RW GUI can be provided with a feature to allow recording the user's own performance without returning to the basic DAW GUI. In addition, further functions of the basic DAW GUI 1 can be incorporated into the RW GUI by appropriate intuitive symbols that the user can choose for activating the corresponding function in the basic DAW.

The functionality of the RW GUI in accordance with an embodiment of the present invention is implemented as an extension of the basic DAW. The full accompaniments offered for selection in the RW GUI are each stored in the DAW system (and each represented as a complete track in the basic DAW GUI 1) for each instrument and each style. For the selection of user performances, empty tracks are provided in the DAW and shown in the basic DAW GUI.

Figure 3:
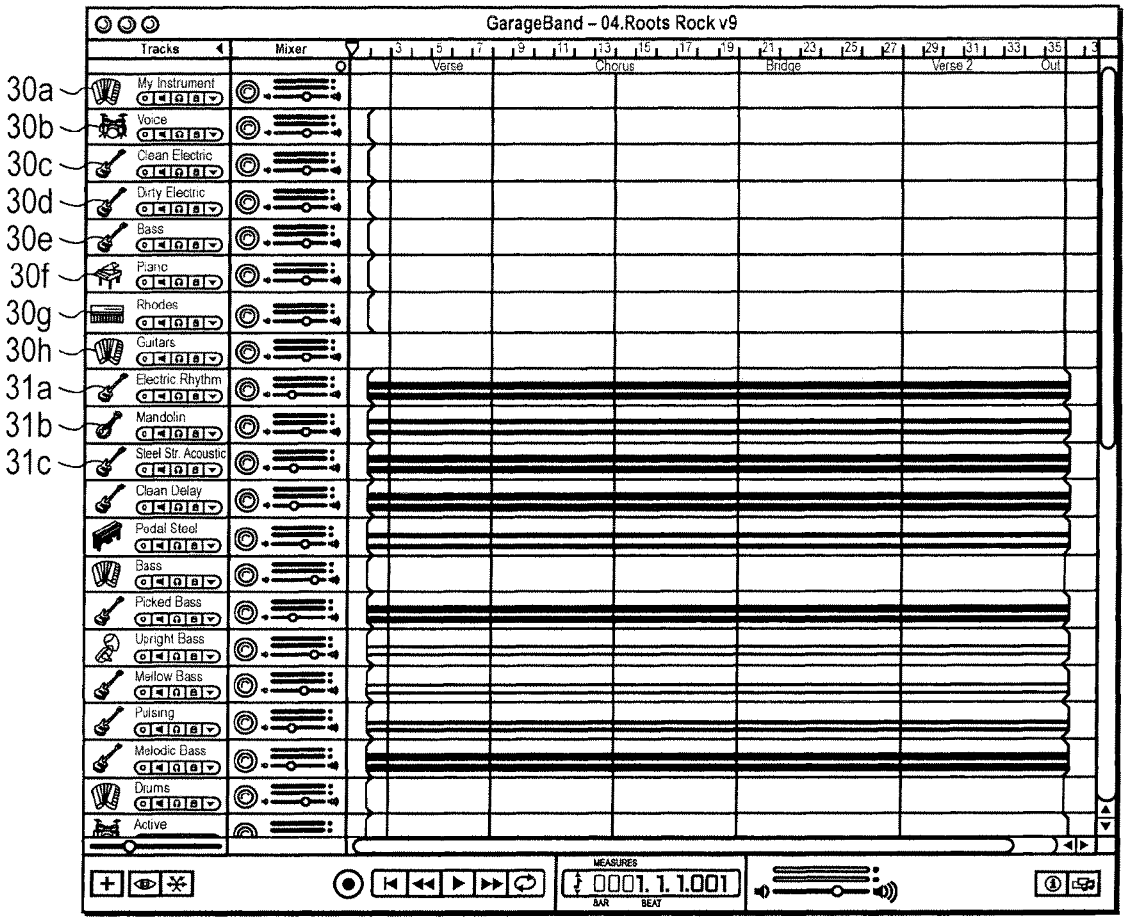
FIG. 3 shows a DAW GUI as known in the prior art after having been adapted to cooperate with the real world RW GUI in accordance with an embodiment of the present invention.

FIG. 3 shows an example of the basic DAW GUI 1 after it has been set up for use by the RW GUI. It represents the total amount of music data for a musical genre available for selection in the RW GUI. This filled-in RW GUI is internal system data of the DAW only and not made available to the normal user of the RW GUI. As the user makes his selection of this available music data by interacting with the RW GUI, he never sees the total music data as shown in FIG. 3.

In the framework of the basic DAW GUI 1 in FIG. 3, a track has been provided for each instrument that can be selected in the RW GUI and each track has a length in accordance with the full length of the piece of music that can be created. Similarly, specific tracks are provided for the instruments the user of the RW GUI can select for his own use.

In the specific example of FIG. 3, altogether eight tracks 30a to 30h are provided with instrument headers but tracks spaces which are empty except for a short, empty region. These empty regions indicate to the application that the user can select one of these tracks in the RW GUI for his own recording as "voice", "Clean Electric", "Dirty Electric", "Bass", "Piano" etc.

The DAW GUI 1 in FIG. 3 is further set up in the DAW with one track for each instrument that can be selected in the second screen of the RW GUI. These tracks are e.g. track 31a "Electric Rhythm", 31b "Mandolin", 31c "Steel String Acoustics" etc. arranged below the tracks for the user performance. Each of these tracks contains musical building blocks (regions) for the complete duration of the piece of music. In the accompaniment tracks, either pre-recorded audio recordings (e.g. in AIFF or CAF format) or software instrument recordings in MIDI format are used as musical building blocks.

The icons presented in the RW GUI are operationally linked with the corresponding icons shown in the header sections of the preset tracks shown in FIG. 3.

Figure 4:
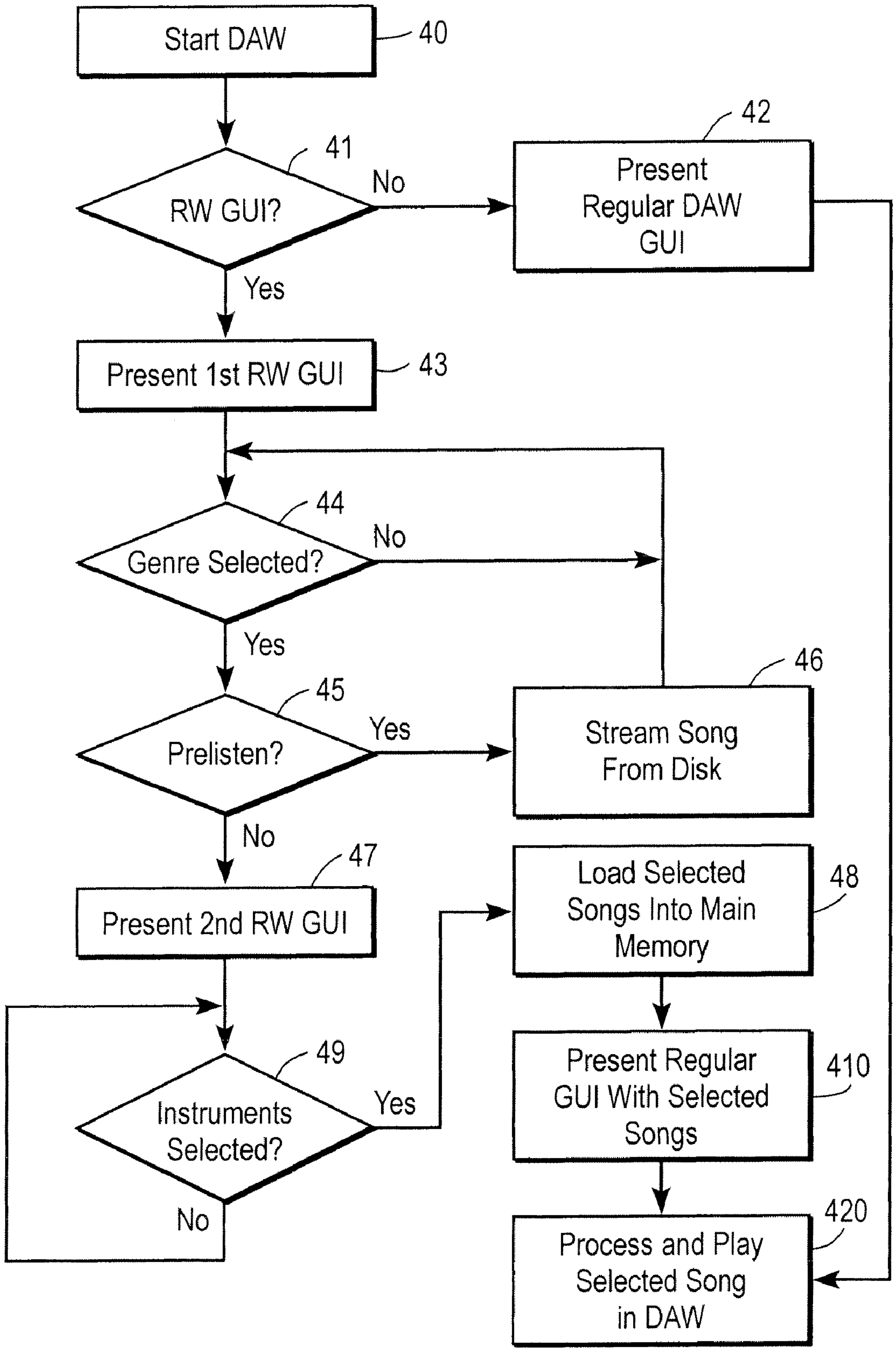
FIG. 4 shows a schematic flow chart of the general operations to invoke the real world RW GUI in accordance with an embodiment of the present invention.

FIG. 4 shows a schematic flow chart of the operations performed in accordance with an embodiment of the present invention in combination with a known DAW.

After starting the DAW in operation 40, the routine in accordance with the invention first checks in operation 41 whether the presentation of the RW GUI has been requested, i.e. a corresponding control element provided in the DAW has been activated. If the RW GUI has not been requested, operation 42 presents the regular DAW GUI 1, e.g. as shown in FIG. 1, and the system proceeds to operation 420 where the user can perform all the composing and editing functions provided by the basic DAW.

If the RW GUI is requested in operation 41, the system in accordance with the invention presents in operation 43 the first screen of the RW GUI for the user to select in operation 44 the desired genre of music. The first screen further provides a command to request pre-listening of the piece of music or accompaniment proposed by DAW as a default selection of instruments and styles for the selected genre of music. Pre-listening can be either in full length or as snippets of music. Operation 45 checks whether pre-listening has been requested.

In a preferred embodiment of the invention, the accompaniments offered for selection by the user are not loaded into the main memory of the DAW computer when the RW GUI is first presented. Such loading would require an excessive amount of memory since the RW GUI offers a wide selection of music genres and instrument tracks each requiring a substantive amount of memory. An accompaniment selected in operation 44 is therefore retrieved from a mass storage device, e.g. a disk memory and streamed from there during pre-listening in operation 46. To secure fast system reaction, musical snippets of the available musical genres may be stored in the main memory and played if pre-listening is requested for snippets only.

After selection of the musical genre, the second screen of the RW GUI is presented in operation 47 which shows the default instruments proposed by the DAW for playing this genre of music. The user of the RW GUI can accept this selection or replace one or several instruments by clicking their symbols as described above.

Operation 49 checks whether the user indicates the completion of his selection of instruments (e.g. by activating a corresponding control button "Create Project" on the second screen of the RW GUI).

Anytime during the processing operations shown in FIG. 4, the second screen of the RW GUI can be closed by activating e.g. a control button "Change genre" to invoke again the first screen of the RW GUI. Additionally, anytime during the processing operations shown in FIG. 4, the first and second screen of the RW GUI can be closed by activating e.g. a general close button to exit the RW GUI and to invoke e.g. the regular DAW GUI again. Furthermore, pre-listening is available after each selection of an instrument in the second screen of the RW GUI as well.

If the user indicates completion of the selection process on the RW GUI, operation 48 loads the full audio data for the selected instruments from mass storage (e.g. disk) into main memory; since only the user selected tracks are loaded, the memory capacity of current personal computers is regularly sufficient for that purpose.

In operation 410, the regular DAW GUI is then presented to display the user-selected tracks in the usual way for further editing and changing in operation 420 with the available tools of the DAW. The resulting DAW GUI might then look similar to one shown in FIG. 1, the track spaces being filled with the user's selection of musical building blocks that were preselected by the manufacturer of the DAW. In addition, an empty track space for his own recordings would be shown if the user made a corresponding selection in the RW GUI.

The present invention can be implemented in numerous ways, e.g. by special electronic circuits, by a program stored on a computer-readable or read-only storage medium or by combinations of these. Such a program enables a computer system or other data processing system to execute one or more of the above described features of the invention. The computer system may comprise a processor coupled to a display device and one or more data storage devices such as a hard drive or other magnetic media and/or an optical media (e.g. CD-ROM) or a semiconductor memory such as DRAM or flash memory. The system may also include a mouse and keyboard both connected electrically to the processor. Other variations of the computer system can be envisaged. For example, the use of a joystick or roller ball or stylus pen and/or a plurality of temporary and hard disk drives and/or connection of the system to the Internet and/or other applications of the system in a specific application which may not include a keyboard or mouse, but rather input buttons and menus on the screen.

The data processing system may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. The program storage medium may be a hard disk drive or other magnetic storage media or a CD or other optical storage media or DRAM or flash memory or other semiconductor storage media or other storage devices.

While the invention has been particularly shown and described with reference to preferred embodiments, it will be understood by those skilled in the art that various changes and modifications in form and detail may be made therein without departing from the scope of the claims of the invention.

What is claimed is:

1. Method of operating a data processing system, the method comprising:

a. presenting on a display device of the data processing system a first graphical user interface having user actionable control elements that are, at least in part, visual representations of musical instruments displayed in a real world environment for creating and processing music, wherein a plurality of the visual representations of musical instruments are configured to play a song in a particular genre of music, the first graphical user interface having a first control element for previewing an entire song and a second control element for previewing a predefined portion of the song, wherein a selection of one of the first control element and the second control element is maintained when a first one of the visual representations is replaced by a second one of the visual representations;

b. activating pre-set functions for generating and processing digital audio data in the data processing system for each of the user actionable control elements in the particular genre of music, wherein the digital audio data are displayed in a second graphical user interface (GUI) having a time scale when the second GUI is displayed.

2. The method of claim 1, wherein the pre-set functions are digital audio data stored in the data processing system for selection in accordance with the visual representations.

3. The method of claim 2, wherein the stored digital audio data is pre-recorded with the musical instrument of the visual representation in a specified musical style.

4. The method of claim 2, wherein the stored digital audio data comprises audio formats, MIDI formats and automation data.

5. The method of claim 2, wherein the digital audio data is selectively retrieved from mass storage by the data processing system for the user-selected set of visual representations.

6. The method of claim 2, wherein the user-selected digital audio data is displayed as a stack of tracks in the second graphical user interface displayed on the display device for processing the digital audio data.

7. The method of claim 6, wherein the stack of tracks comprises a selection of tracks for future recordings by the user.

8. A first graphical user interface for a digital audio processor, comprising:

a) a plurality of graphical control elements displayed on a display device on the first graphical user interface representing music-related objects that are, at least in part, visual representations of musical instruments in a real-world environment for creating and processing music, wherein the plurality of visual representations of musical instruments are configured to play a song in a particular genre of music, the first graphical user interface having a first control element for previewing an entire song and a second control element for previewing a predefined portion of the song, wherein a selection of one of the first control element and the second control element is maintained when a first one of the visual representations is replaced by a second one of the visual representations;

b) operative connections between the graphical control elements and pre-set functions of the digital audio processor adapted to create and modify digital audio data in the particular genre of music, wherein the digital audio data are displayed in a second graphical user interface (GUI) having a time scale when the second GUI is displayed.

9. The graphical first user interface of claim 8, wherein the operative connections invoke digital audio data pre-recorded by the visualized musical instrument in the particular genre of music.

10. The first graphical user interface of claim 8, wherein the plurality of visual representations of the musical instruments represents a default selection of instruments for the particular music genre.

11. The first graphical user interface of claim 10, wherein activation of at least one of the visual representations of the musical instrument causes the display of alternate visualized musical instruments linked to the digital audio data for selection by the user.

12. The first graphical user interface of claim 10, wherein activation of at least one of the visual representations of the musical instrument causes the display of a selection menu with entries linked to the digital audio data.

13. The first graphical user interface of claim 8, wherein a selected one of the graphical control elements is highlighted by a spot light in the real world environment.

14. The first graphical user interface of claim 8, wherein a selection menu for the genre of music is presented in a first screen invoked before a second screen for selecting the instruments.

15. The first graphical user interface of claim 14, wherein the selection items in the first screen are posters with contents that are used in the second screen to display the selection of the genre of music.

16. A digital audio processor, comprising:

a. a first graphical user interface that comprises a plurality of graphical control elements displayed on a display device on the first graphical user interface representing music-related objects that are, at least in part, visual representations of musical instruments in a real-world environment for creating and processing music, wherein the plurality of visual representations of musical instruments are configured to play a song in a particular genre of music, the first graphical user interface having a first control element for previewing an entire song and a second control element for previewing a predefined portion of the song, wherein a selection of one of the first control element and the second control element is maintained when a first one of the visual representations is replaced by a second one of the visual representations; and operative connections between the graphical control elements and pre-set functions of the digital audio processor adapted to create and modify digital audio data in the particular genre of music, wherein the digital audio data are displayed in a second graphical user interface (GUI) having a time scale when the second GUI is displayed;

b. a second graphical user interface having a time scale that can be invoked by the first graphical user interface for processing digital audio data;

c. stored digital audio data selectable through the first graphical user interface for processing by entering commands through the second graphical interface.

17. A non-transitory computer readable medium containing executable program instructions to cause a data processing system to perform a method comprising:

a. presenting on a display device of the data processing system a first graphical user interface having user actionable control elements that are, at least in part, visual representations of musical instruments displayed in a real world environment for creating and processing music, wherein a plurality of the visual representations of musical instruments are configured to play a song in a particular genre of music, the first graphical user interface having a first control element for previewing an entire song and a second control element for previewing a predefined portion of the song, wherein a selection of one of the first control element and the second control element is maintained when a first one of the visual representations is replaced by a second one of the visual representations;

b. activating pre-set functions for generating and processing digital audio data in the data processing system for each of the user actionable control elements in the particular genre of music, wherein the digital audio data are displayed in a second graphical user interface (GUI) having a time scale when the second GUI is displayed.

18. The medium of claim 17, wherein the pre-set functions are digital audio data stored in the data processing system for selection in accordance with the visual representations.

19. The medium of claim 18, wherein the stored digital audio data is pre-recorded with the musical instrument of the visual representation in a specified musical style.

20. The medium of claim 18, wherein the stored digital audio data comprises audio formats, MIDI formats and automation data.

21. The medium of claim 18, wherein the digital audio data is selectively retrieved from mass storage by the data processing system for the user-selected set of visual representations.

22. The medium of claim 18, wherein the user-selected digital audio data is displayed as a stack of tracks in the second graphical user interface displayed on the display device for processing the digital audio data.

23. The medium of claim 22, wherein the stack of tracks comprises a selection of tracks for future recordings by the user.

* * * * *